United States Patent
Nidumolu et al.

(10) Patent No.: US 11,809,464 B2
(45) Date of Patent: Nov. 7, 2023

(54) SYSTEMS AND METHODS FOR LOCATION PROCESSING AND GEOCODING OPTIMIZATION

(71) Applicant: Verizon Patent and Licensing Inc., Arlington, VA (US)

(72) Inventors: Praveen K Nidumolu, Reston, VA (US); Raj Kumar Narayan, Vienna, VA (US); Daniel S Clausen, Plano, TX (US); Farid Feisullin, Leesburg, VA (US)

(73) Assignee: Verizon Patent and Licensing InG., Basking Ridge, NJ (US)

( * ) Notice: Subject to any disclaimer, the term of this patent is extended or adjusted under 35 U.S.C. 154(b) by 405 days.

(21) Appl. No.: 16/791,450

(22) Filed: Feb. 14, 2020

(65) Prior Publication Data
US 2021/0256040 A1   Aug. 19, 2021

(51) Int. Cl.
G06F 16/29       (2019.01)
H04W 4/02        (2018.01)
G06F 16/2457     (2019.01)
G06F 18/2321     (2023.01)

(52) U.S. Cl.
CPC ........ G06F 16/29 (2019.01); G06F 16/24578 (2019.01); G06F 18/2321 (2023.01); H04W 4/025 (2013.01)

(58) Field of Classification Search
CPC . G06F 16/29; G06F 16/24578; G06K 9/6221; H04W 4/025
USPC ........................................................ 707/724
See application file for complete search history.

(56) References Cited

U.S. PATENT DOCUMENTS

| | | | |
|---|---|---|---|
| 10,726,090 B1* | 7/2020 | Compton | H04L 51/222 |
| 2013/0115972 A1* | 5/2013 | Ziskind | H04W 4/21 |
| | | | 455/456.2 |
| 2014/0278051 A1* | 9/2014 | McGavran | G01C 21/00 |
| | | | 706/45 |
| 2019/0088032 A1* | 3/2019 | Milbert | G06F 3/0483 |
| 2019/0212977 A1* | 7/2019 | Sicurelli, III | G06F 7/08 |

(Continued)

OTHER PUBLICATIONS

"Daniel W. Goldberg, A Geocoding Best Practices Guide, Nov. 2008, University of Southern California GIS Research Laboratory, North American Association of Central Cancer Registries, Inc., pp. 97-109" (Year: 2008).*

*Primary Examiner* — Hosain T Alam
*Assistant Examiner* — Saba Ahmed

(57) ABSTRACT

A device may obtain a location. The device may process the location to form a processed address. The device may obtain, from a plurality of geocoders, a plurality of sets of geographic coordinate candidates for the processed address. The device may obtain confidence information regarding the plurality of sets of geographic coordinate candidates. The device may determine a set of geographic coordinates for the processed address based on the plurality of sets of geographic coordinate candidates and the confidence information regarding the plurality of sets of geographic coordinate candidates. The device may assign a key to the processed address and the set of geographic coordinates for the processed address. The device may store, in a storage device, the key in association with the processed address and the set of geographic coordinates to facilitate access to the processed address or the set of geographic coordinates for the processed address.

20 Claims, 7 Drawing Sheets

(56) References Cited

U.S. PATENT DOCUMENTS

2019/0318014 A1* 10/2019 Valegerepura .... G06F 16/90324
2020/0183900 A1*  6/2020 Iska ..................... G06F 16/215

* cited by examiner

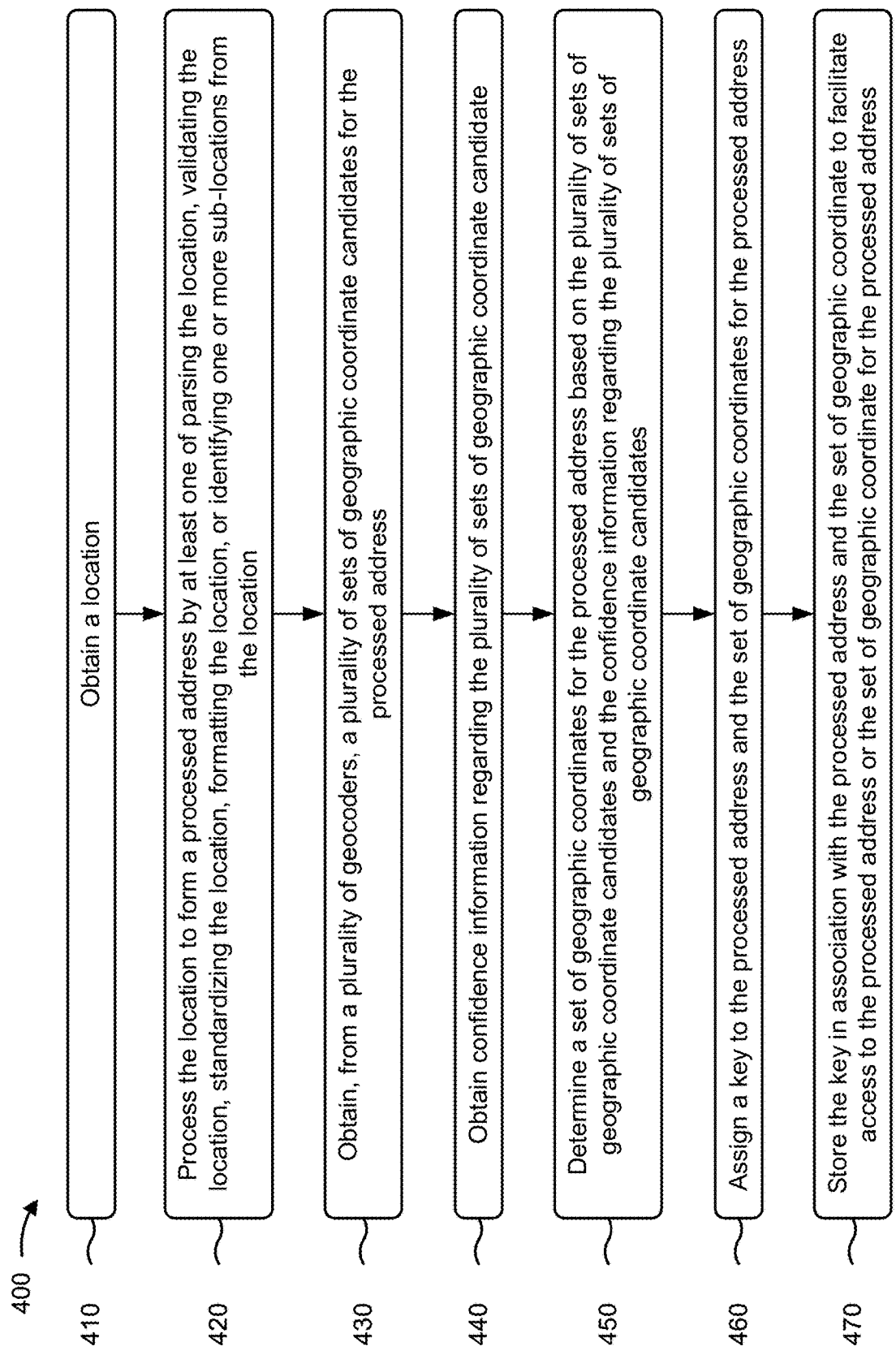

SYSTEMS AND METHODS FOR LOCATION PROCESSING AND GEOCODING OPTIMIZATION

BACKGROUND

Geocoding involves processing input related to a location and outputting geographic coordinates for the location. Geocoding processes vary and result in differing degrees of positional accuracy.

BRIEF DESCRIPTION OF THE DRAWINGS

FIG. 4 is a flow chart of an example process for location processing and geocoding optimization.

DETAILED DESCRIPTION OF PREFERRED EMBODIMENTS

Figure 1A:
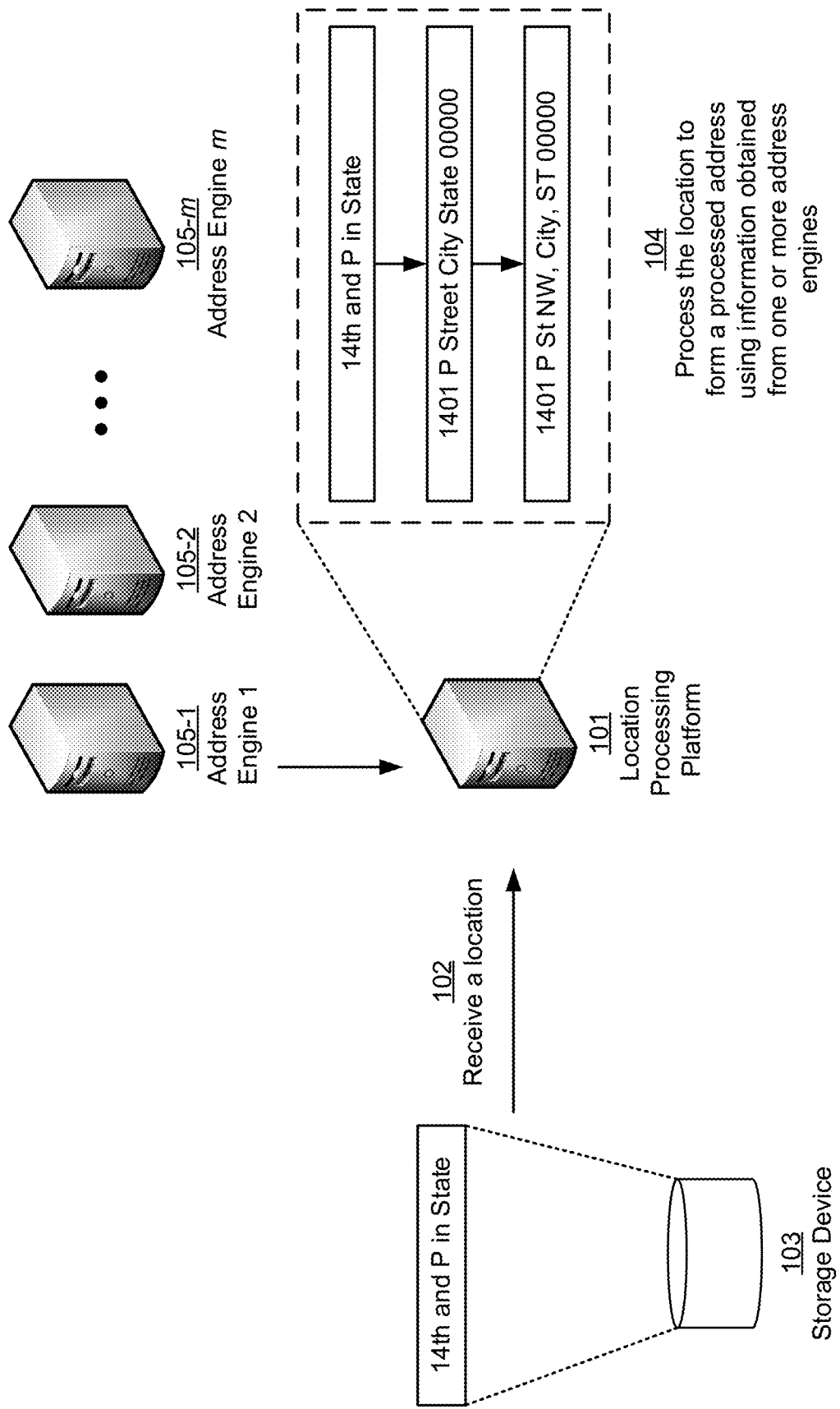
FIGS. 1A-1D are diagrams of one or more example implementations described herein.

The following detailed description of example implementations refers to the accompanying drawings. The same reference numbers in different drawings may identify the same or similar elements.

Geocoding involves processing input describing a location (e.g., an address, a name of a place, and/or the like) and outputting geographic coordinates (e.g., latitude and longitude coordinates) associated with the location. Geocoding methods vary and result in differing degrees of positional accuracy. For example, geocoding methods may be based on postal code centroids, building centroids, interpolated locations, and/or the like. The geocoding methods may have variations in accuracy as well as precision. Moreover, geocoding results may be accurate based on a method used, but a particular method may not be accurate for all types of locations. That is, the geocoding results may be accurate using a particular geocoding method for one geographic area, but inaccurate using the particular geocoding method for another geographic area. For example, geocoding based on postal codes may provide different degrees of accuracy for a dense, urban area versus a sparse, rural area. Urban postal codes may represent small areas because the urban postal codes may approximate a city block, while rural postal codes may represent large areas due to a larger spread of streets. Therefore, geocoding based on postal code may be more accurate for urban postal codes, because the smaller area may allow for more precise location mapping. In turn, using a particular geocoder for all types of areas may lead to undesirable results in some areas. Low accuracy may result in incorrect geographic coordinates being associated with a location which may lead to a waste of computing resources (e.g., processing resources, memory resources, communication resources, and/or the like) and/or network resources in attempting to remedy errors.

In addition, geocoding, along with other processes, may require particularized input to properly process information identifying a location. For example, the location input may need to be in a standardized address format, such as conforming to the United States Postal Service Postal Addressing Standard. Location inputs that do not adhere to the standardized address format may be ineffectively processed, resulting in errors or unexpected results. For example, a non-standardized address format may result in incorrect geographic coordinates being determined or an error in attempting to process the non-standardized address format. Even a seemingly minor difference (e.g., "STR" instead of "ST" to indicate "street") may cause undesirable results (e.g., a geocoder that is unable to process the location, a geocoder that processes a different location than the location that was meant to be processed, and/or the like). This may lead to a waste of computing resources used to identify, diagnose, and remedy errors that are made due to undesirable results.

Some implementations described herein provide a location processing platform that is capable of processing a location to form a processed address to be used as input for geocoders. In this way, a processed address adhering to a standardized address format may be used as input for the geocoders. This may conserve computing resources associated with detecting or remedying errors due to processing locations with a non-standardized address format (e.g., incorrect geographic coordinates outputted due to a non-standardized address format, an inability to process a location due to a non-standardized address format, and/or the like).

Additionally, or alternatively, some implementations described herein may use a plurality of geocoders to determine a set of geographic coordinates corresponding to the location. In this way, the location processing platform may determine a more accurate set of geographic coordinates than in a case where the location processing platform depends on a single geocoder to determine a set of geographic coordinates corresponding to the location. In turn, this may conserve computing resources (e.g., processing resources, memory resources, communication resources, and/or the like) that would have otherwise been used to identify or rectify errors due to processes depending on an inaccurate set of geographic coordinates due to an inaccurate set of geographic coordinates being output.

In some implementations, a key may be generated to associate the processed address and the set of geographic coordinates such that various sources may access the processed address and/or the set of geographic coordinates. Because data (e.g., the processed address and the set of geographic coordinates) is not stored on a different system, the data, while still accessible, is secure. This improves security and saves computing resources (e.g., processor resources, memory resources, communication resources, and/or the like) that would otherwise have been used in attempting to identify, diagnose, and remedy security threats caused by data breaches. For example, computing resources that may otherwise have been used in executing additional processes to identify a cause of the security breach may no longer be used, because of the reduction or elimination of security breaches. In addition, because the data (e.g., the processed address and the set of geographic coordinates) is accessible by the various sources, the various sources may update accordingly, allowing the various sources to use the data to create improved databases. This allows the various sources to improve an accuracy, thereby conserving computing resources associated with identifying or rectifying errors due to processes depending on inaccurate or outdated data stored by the sources. In some implementations, the various sources may not update separate databases and instead use the key to allow access to the data, thereby conserving storage resources associated with storing the updated data across the various sources.

FIGS. 1A-1D are diagrams of one or more example implementations 100 described herein. As shown in FIGS. 1A-1D, example implementation(s) 100 may include a location processing platform 101, storage device 103, address engines 105 (shown as address engines 105-1 to 105-*m*, and referred to individually as address engine 105 and collectively address engines 105), and geocoders 107 (shown as geocoders 107-1 to 107-*n*, and referred to individually as geocoder 107 and collectively geocoders 107).

As shown in FIG. 1A, and by reference number 102, the location processing platform 101 may receive a location from the storage device 103. This begins the process for the location processing platform 101 to generate a processed address that meets a particular standard, such as the United States Postal Service Postal Addressing Standard. The location processing platform 101 may use the processed address as input for geocoding to obtain an accurate set of geographic coordinates for the processed address.

In some implementations, the location may include various information to identify the location. For example, the location may be an address that includes information that conforms to a particular standard (e.g., containing elements describing a house number, street name, name of town, state name, postal code, and/or the like). In some implementations, the location may be a non-standard address. For example, the non-standard address may be a descriptive name associated with the location, lacking one or more elements of a standard address (e.g., missing a postal code, street name, and/or the like), and/or the like. The storage device 103 may include various locations of different formats (e.g., standard addresses, non-standard addresses, addresses with 5-digit postal codes, addresses with 9-digit postal codes, and/or the like). In some implementations, the storage device 103 may aggregate locations from a plurality of address databases. In some implementations, the storage device 103 may not aggregate locations from the plurality of address databases but rather may be one of the plurality of address databases that store locations in various formats. In this case, the location processing platform 101 may interact with the plurality of address databases to receive locations.

As shown in FIG. 1A, and by reference number 104, the location processing platform 101 may process the location to form a processed address using information obtained from one or more address engines 105. In this way, the location processing platform may generate an address (e.g., the processed address) that adheres to a particular standard. The processed address may then be used as a reliable address to identify the location, used as reliable input for a geocoder, and/or the like. This may conserve computing resources (e.g., processing resources, memory resources, communication resources, and/or the like) that would have otherwise been used to identify and/or rectify a candidate address because the candidate address is incorrectly parsed and/or missing one or more elements needed to properly process the candidate address.

The location processing platform 101 may apply one or more location processing methods to process the location. For example, the location processing platform 101 may parse the location, validate the location (e.g., determine whether the location is a valid location, determine whether the location exists, determine whether the location is accessible, and/or the like), standardize the location (e.g., ensure the location matches particular standards, update location terms to match particular abbreviations, and/or the like), format the location (e.g., ensure the location is in a proper format for processing by other devices and/or methods, ensure there is proper spacing in the location information, and/or the like), and/or the like. In some implementations, the location processing platform 101 may determine a sub-location for the location (e.g., determine whether the location corresponds to a unit in a multi-unit building, determine whether the location corresponds to a building in a multi-building compound, determine what units exist in a multi-unit building, and/or the like). The location processing platform 101 may perform the plurality of location processing methods in a particular sequence or iteratively. In some implementations, the location processing platform 101 may perform one or more of the location processing methods multiple times.

In some implementations, the location processing platform 101 may use various address engines 105 to assist in performing one or more location processing methods (e.g., parsing, standardization, validation, formatting, sub-location processing, and/or the like) on the location. The address engines 105 may include commercially available address engines, such as Google Maps, Bing Maps, MapQuest, and/or the like. The location processing platform 101 may transmit the location to one or more address engines 105. The address engines 105 may perform one or more processing methods (e.g., parsing, standardization, validation, formatting, sub-location processing, and/or the like) on the transmitted location.

In some implementations, an address engine 105 may output a processing outcome (e.g., a candidate address, information to assist the location processing platform 101 perform a processing method on the location, information to assist the location processing platform 101 make a determination regarding a processed address, and/or the like) as a result of performing one or more processing methods on the location. Additionally, or alternatively, the address engine 105 may output metadata associated with the processing outcome that may be used by the location processing platform 101 to evaluate a reliability of the processing outcome (e.g., information on what technique was were used to generate the candidate address, information on whether the candidate address was verified (e.g., human verification), and/or the like). The location processing platform 101 may receive the processing outcome and the metadata associated with the processing outcome to evaluate a reliability of the processing outcome.

Based on a determined reliability of one or more processing outcomes, the location processing platform 101 may determine the processed address. For example, the location processing platform 101 may determine that a particular processing outcome has a high reliability (e.g., a highest reliability of all processing outcomes, a reliability that satisfies a particular threshold, and/or the like), and determine to use the particular processing outcome to generate the processed address. In some implementations, the processing outcome comprises a candidate address and the location processing platform 101 may use the candidate address as the processed address. Additionally, or alternatively, the processing outcome may comprise information on how to modify the location and the location processing platform 101 may use the information to modify the location to form the processed address. In some implementations, two or more processing outcomes (e.g., candidate addresses) may have high reliabilities for different parts of the location (e.g., a postal code, a street name, and/or the like), and the location processing platform 101 may combine the two or more processing outcomes to form the processed address. In this way, the location processing platform 101 may evaluate processing outcomes from a plurality of address engines, rather than a single address engine, to determine the processed address. This may increase a reliability of the processed address, since the location processing platform 101 may determine a best processing outcome using several different address engines (and thereby several different techniques for each processing method), rather than relying on a processing outcome of a single address engine.

Figure 1B:
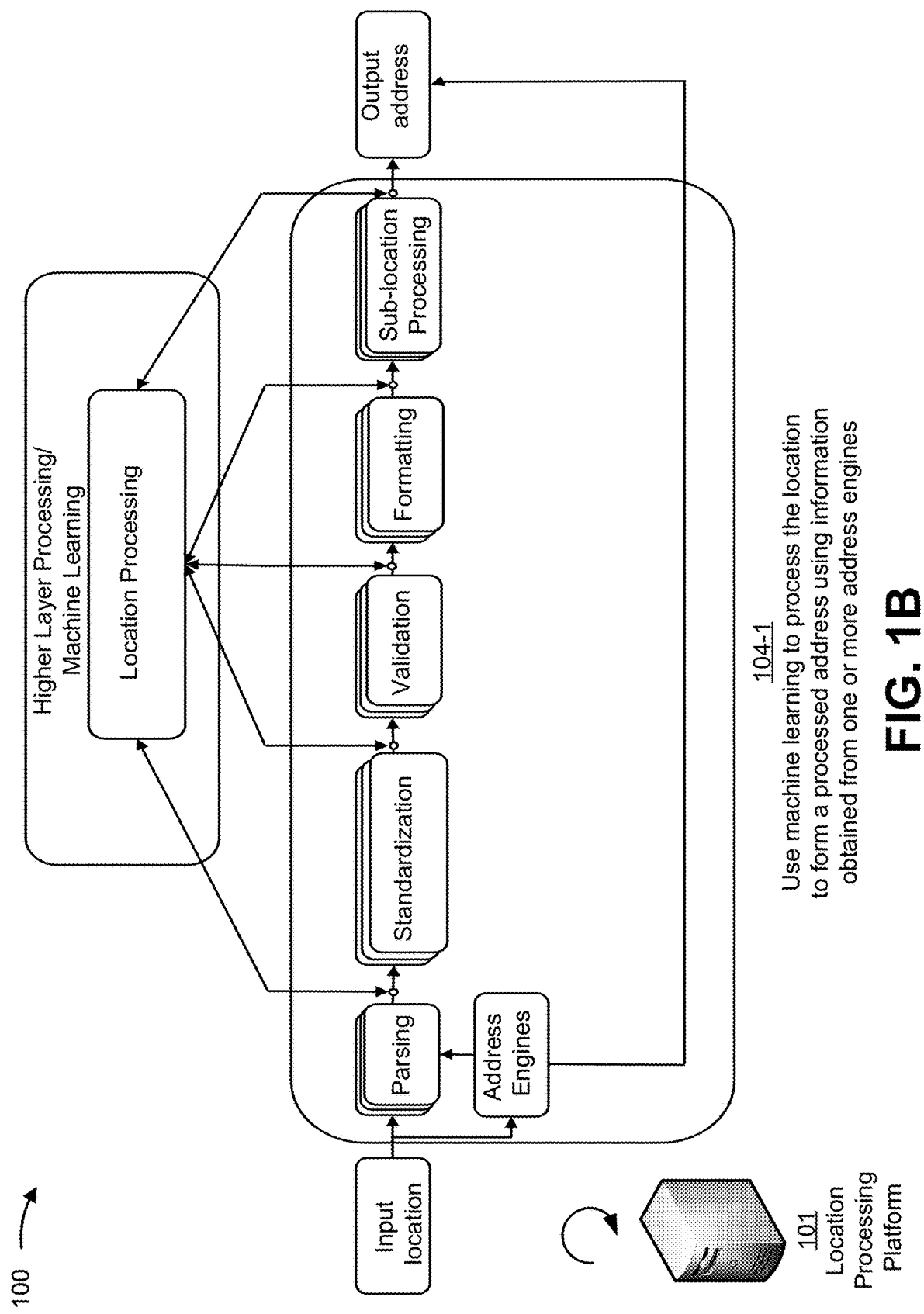

As shown in FIG. 1B, and by reference number 104-1, the location processing platform 101 may use higher layer processing, machine learning, and/or the like to form the processed address. At each processing stage (e.g., parsing, standardization, validation, formatting, sub-location processing, and/or the like), the location processing platform 101 may obtain a plurality of processing outcomes (e.g., parsing outcomes, standardization outcomes, validation outcomes, formatting outcomes, sub-location processing outcomes, and/or the like) from a plurality of address engines 105. In some implementations, the address engines 105 may output processing outcomes as a result of performing different processing methods on the location, such as outputting candidate addresses for a particular processing method (e.g., a parsed address candidate, a standardized address candidate, a validated address candidate, a formatted address candidate, a sub-location processed address candidate, and/or the like). At a particular processing stage (e.g., one or more of the processing stages, all of the processing stages, and/or the like), the location processing platform 101 may also obtain metadata from the plurality of address engines 105 associated with processing outcomes that indicate measures of reliability of the processing outcomes. The location processing platform 101 may use machine learning, higher layer processing, and/or the like to evaluate the metadata associated with the processing outcomes to determine a best processing outcome for a processing stage. The best processing outcome for each processing stage may be used to determine the processed address. For example, the best processing outcome for a processing stage may be used as input for another processing stage. In some implementations, the best processing outcome for the processing stages may be used as the processed address. In some implementations, one or more best processing outcomes may be combined to form the processed address.

The following description details a process that may occur when the location processing platform 101 performs a series of processing methods (e.g., parsing, standardization, validation, formatting, sub-location processing, and/or the like) to process the location. It is noted that the processing methods need not be performed in any particular sequence, may be performed iteratively, may be performed collaterally, may not be performed at all, and/or the like. Additionally, or alternatively, the address engines 105 include various address engines that may be used to process the location, including address parsing engines, address standardization engines, address validation engines, address formatting engines, sub-location processing engines, and/or the like. Therefore, a first subset of the address engines 105 used to perform a first processing method may be the same as, different than, or inclusive of a second subset of the address engines 105 used to perform a second processing method.

For example, the location processing platform 101 may use a subset of the address engines 105 to parse the location. Each of the subset of the address engines 105 may use different parsing methods to parse the location. For example, the address engines 105 may parse the location using natural language processing, a data preprocessing operation, and/or the like to read the location, prepare the location for other processing methods, and/or the like. For example, an address engine 105 may parse natural language descriptions of the location to obtain data identifying, in natural language, a description of the location and may parse the data to identify parts of the location (e.g., a building number, a street name, a postal code, and/or the like). In some implementations, the address engines 105 may determine a characteristic of the location based on natural language processing of the location. In another example, the location processing platform 101 may perform a data preprocessing operation to remove non-ASCII characters, white spaces, confidential data (e.g., personal information, proprietary information, and/or the like). Based on parsing the location, each of the subset of the address engines 105 may send a respective parsing outcome (e.g., a parsed address candidate, information that the address engine was unable to parse the location, information to assist in parsing the location, and/or the like) to the location processing platform 101.

In some implementations, one or more of the subsets of the address engines 105 may send metadata associated with a respective parsing outcome to assist the location processing platform 101 evaluate a reliability of each parsing outcome. For example, an address engine 105 may send metadata indicating which parsing technique was used to parse the location, whether the parsing technique was verified through another technique, a measure of accuracy of the parsing technique that was used, and/or the like to indicate a reliability of the parsing outcome. The location processing platform 101 may determine a reliability weight for each type of metadata associated with a parsing outcome. The reliability weight may indicate which types of metadata have a strong correlation with a high reliability of the parsing outcome. For example, metadata indicating that a parsing outcome has been confirmed by an additional technique may be determined to have a strong correlation with a high reliability of the parsing outcome, and thus be assigned a high reliability weight. Therefore, metadata indicating that a parsing outcome has been confirmed may have a high positive impact on the calculated reliability weight whereas metadata indicating that a parsing outcome has not been confirmed may have a high negative impact on the calculated reliability weight. Additionally, or alternatively, different parsing techniques may be determined to output results of similar accuracy. Based on this, the location processing platform 101 may determine that metadata indicating which type of parsing technique was used does not have a strong correlation with a high reliability of a parsing outcome. That is, since a first parsing outcome derived from a first parsing technique is of similar reliability to a second parsing outcome derived from a second parsing technique, the metadata reflecting which parsing technique was used may not be helpful in assisting the location processing platform 101 determine whether the first parsing outcome is more accurate than the second parsing outcome. Therefore, the location processing platform 101 may assign a low reliability weight to the metadata indicating which type of parsing technique was used.

The reliability weights of different types of metadata for a parsing outcome may be combined to form a combined reliability weight that indicates whether a parsing outcome is reliable. In some implementations, the address engines 105 may send information regarding which types of metadata have a high reliability, a high reliability weight, a low reliability, a low reliability weight, and/or the like. Additionally, or alternatively, the location processing platform 101 may obtain information from one or more sources indicating which types of metadata have a high reliability, a high reliability weight, a low reliability, a low reliability weight, and/or the like. In some implementations, a best parsing outcome may be generated from the parsing outcome with the highest combined reliability weight. In some implementations, the best parsing outcome may be generated from one or more parsing outcomes with a combined reliability weight that exceeds a particular threshold.

In some implementations, the location processing platform 101 may use machine learning, higher layer processing, and/or the like to evaluate the parsing outcomes and/or the metadata associated with the parsing outcomes to determine a best parsing outcome from the plurality of parsing outcomes. The best parsing outcome, for example, a parsing outcome with the highest weight, may be used to generate a parsed address. The parsed address may have a high reliability compared to the parsed address candidates. In turn, the parsed address may be used as input for other processing methods (e.g., standardization, validation, formatting, sub-location processing), for additional parsing, as the processed address, and/or the like. The location processing platform 101 may determine the best parsing outcome by determining a reliability for each of the parsing outcomes and determining a particular reliability parsing outcome to be the best parsing outcome. For example, the location processing platform 101 may determine that a particular parsing outcome is the best parsing outcome if the parsing outcome is determined to have a reliability that satisfies a particular threshold, a reliability determined to be the highest out of reliabilities of all the parsing outcomes, a high reliability relative to other determined reliabilities, and/or the like. Additionally, or alternatively, the location processing platform 101 may determine that a particular parsing outcome has a high reliability based on determining that multiple parsing outcomes are the same, that multiple parsing outcomes are similar within a tolerance, and/or the like.

In some implementations, the location processing platform 101 may use machine learning to determine which characteristics of the parsing outcomes and/or the metadata associated with the parsing outcomes indicate a high reliability. The location processing platform 101 may use machine learning to assign reliability weights to the characteristics of the parsing outcomes and/or the metadata associated with the parsing outcomes. (e.g., assign high weights to high reliability characteristics, assign low weights to low reliability characteristics, and/or the like). In some implementations, the location processing platform 101 may use machine learning to reassign, manipulate, and/or alter the reliability weights of the characteristics of the parsing outcomes and/or the metadata associated with the parsing outcomes. The location processing platform 101 may perform calculations with the reliability weights (e.g., combining reliability weights of different types for each parsing outcome), and evaluate the different calculated reliability weights of the parsing outcomes to determine the best parsing outcome. For example, the best parsing outcome may be generated from the parsing outcome with the highest calculated reliability weight. In some implementations, the best parsing outcome may be generated from one or more parsing outcomes with a calculated reliability weight that exceeds a particular threshold.

The location processing platform 101 may use a parsing outcome evaluation model to determine the best parsing outcome by evaluating which parsing outcome has a high reliability. The location processing platform 101 may train the parsing outcome evaluation model based on one or more parameters, such as the metadata associated with the parsing outcomes and/or the like. The location processing platform 101 may train the parsing outcome evaluation model using historical data associated with determining the best parsing outcome, and/or determining the best outcome for other processes (e.g., validation, standardization, formatting, sub-location processing, and/or the like). Using the historical data and the one or more parameters as inputs to the parsing outcome evaluation model, the location processing platform 101 may determine characteristics of the parsing outcomes, the metadata associated with the parsing outcomes, the location, and/or the like that indicate a high reliability, and therefore a best parsing outcome.

For example, the location processing platform 101 may determine whether a particular address engine 105 has a high reliability for parsing outcomes, whether a particular parsing technique has a high reliability, whether a particular address engine 105 has a high reliability for parsing a particular type of location (e.g., a standard address, a non-standard address, a location in a particular geographic region, and/or the like), and/or the like. Additionally, or alternatively, the location processing platform 101 may determine that a particular parsed outcome has a high reliability based on multiple address engines 105 outputting the same particular parsed outcome, outputting similar particular parsed outcomes, and/or the like. Based on applying a rigorous and automated process associated with location parsing, the location processing platform 101 enables recognition and/or identification of thousands or millions of parameters associated with parsing the location, thereby increasing an accuracy and consistency of location parsing relative to requiring computing resources to be allocated for hundreds or thousands of technicians to manually parse the location.

In some implementations, the location processing platform 101 may perform a training operation when generating the parsing outcome determination model. For example, the location processing platform 101 may portion the location, the parsing outcomes, and/or the metadata associated with the parsing outcomes into a training set (e.g., a set of data to train the model), a validation set (e.g., a set of data used to evaluate a fit of the model and/or to finetune the model), a test set (e.g., a set of data used to evaluate a final fit of the model), and/or the like. In some implementations, the location processing platform 101 may preprocess and/or perform dimensionality reduction to reduce the outcomes, and/or the metadata to a minimum feature set. In some implementations, the location processing platform 101 may train the parsing outcome determination model on this minimum feature set, thereby reducing processing to train the machine learning model, and may apply a classification technique, to the minimum feature set.

Additionally, or alternatively, the location processing platform 101 may train the model using a supervised training procedure that includes receiving input to the model, which may reduce an amount of time, an amount of processing resources, and/or the like to train the parsing outcome determination model, relative to an unsupervised training procedure. In some implementations the location processing platform 101 may use one or more other model training techniques, such as a neural network technique, a latent semantic indexing technique, and/or the like. For example, the location processing platform 101 may perform an artificial neural network processing technique (e.g., using a two-layer feedforward neural network architecture, a three-layer feedforward neural network architecture, and/or the like) to perform pattern recognition with regard to patterns of whether the parsing outcomes, and/or metadata associated with the parsing outcomes described using different semantic descriptions may be used to determine a best parsing outcome and/or determine a parsed address or not.

In this case, using the artificial neural network processing technique may improve an accuracy of a model (e.g., the parsing outcome determination model) generated by the location processing platform 101 by being more robust to noisy, imprecise, or incomplete data, and by enabling the location processing platform 101 to detect patterns and/or trends undetectable to human analysts or systems using less complex techniques.

In some implementations, a different device may generate and train the parsing outcome determination model. The different device may send the parsing outcome determination model for use by the location processing platform 101. The different device may update and send (e.g., on a scheduled basis, on an on-demand basis, on a triggered basis, on a periodic basis, and/or the like) the parsing outcome determination model to the location processing platform 101.

Accordingly, the location processing platform 101 may use any number of artificial intelligence techniques, machine learning techniques, higher layer processing techniques, deep learning techniques, and/or the like to determine the parsed address based on parsing outcomes and metadata associated with the parsing outcomes from the address engines 105.

As stated above, while parsing was described first, parsing may not be performed in any particular order to process the location. Parsing may occur iteratively or simultaneously with other processing methods to process the location. In some implementations, parsing may be the only step performed in processing the location.

In some implementations, the location processing platform 101 may standardize the location by evaluating one or more standardization outcomes from a subset of address engines 105. As stated previously, the subset of address engines 105 used for standardization may be the same address engines 105 as, different address engines 105 than, or inclusive address engines 105 of the subset of address engines 105 used to parse the location. In some implementations, an address engine 105 may send a processing outcome after performing multiple processing methods (e.g., parsing, standardization, validation, formatting, sub-location processing, and/or the like) on the location.

In standardizing the location, the subset of address engines 105 may apply one or more standardization techniques to match the location to a standard, such as the United States Postal Service Postal Addressing Standard. This may entail correcting spelling errors, abbreviating according to United States Postal Service standard abbreviations, and/or the like. The subset of address engines 105 may apply the one or more standardization techniques to the location, the parsed address (e.g., the location after determining the best parsed outcome), the location after being processed through other processing methods (e.g., validation), and/or the like. The subset of address engines 105 may output standardization outcomes (e.g., a standardized address, information to standardize the location, and/or the like). In some implementations, the subset of address engines 105 may send metadata associated with the standardization outcomes to assist the location processing platform 101 to determine a best standardization outcome from the standardized outcomes. For example, an address engine 105 may send metadata indicating which standardization technique was used to standardize the location, whether the standardization technique was verified through another technique, a measure of accuracy of the standardization technique that was used, and/or the like to indicate a reliability of the standardization outcome.

Similarly to determining the best parsing outcome, the location processing platform 101 may execute processes to determine the best standardization outcome by evaluating a reliability of one or more standardization outcomes. For example, the location processing platform 101 may use a machine learning model, such as a standardization outcome evaluation model to determine the best standardization outcome by evaluating which standardization outcome has a high reliability. The location processing platform 101 may train the standardization outcome evaluation model based on one or more parameters, such as the metadata associated with the standardization outcomes and/or the like. The location processing platform 101 may train the standardization outcome evaluation model using historical data associated with determining the best standardization outcome, and/or determining the best outcome for other processing methods (e.g., parsing, validation, formatting, sub-location processing, and/or the like). Using the historical data and the one or more parameters as inputs to the standardization outcome evaluation model, the location processing platform 101 may determine characteristics of the standardization outcomes, the metadata associated with the standardization outcomes, the location, and/or the like that indicate a high reliability, and therefore a best standardization outcome.

In some implementations, the location processing platform 101 may use one or more of the address engines 105 to validate the location. Validating the location may comprise comparing the location against one or more existing address databases to confirm an existence, validity, and/or the like of the location. For example, an address engine 105 may validate the location by determining whether an exact match of the location appears in the United States Postal Service database. In another example, the address engine 105 may validate the location by determining whether a similar match of the location appears in the United States Postal Service database (e.g., whether a threshold percentage of characters match). In some implementations, the address engine 105 may instead use a parsed address (e.g., the location after a successful parsing process), a standardized address (e.g., the location after a successful standardization process), a partially processed address (e.g., the location after one or more processing methods were applied to the location), and/or the like.

The address engine 105 may send a validation outcome (e.g., a validated address candidate, information on whether a location is valid, and/or the like) to the location processing platform 101. In some implementations, the address engine 105 may send metadata associated with the validation outcome indicating a reliability of the validation outcome. The metadata associated with the validation outcome may include information indicating a technique used to determine the validation outcome. In some implementations, a plurality of the address engines 105 may send a respective validation outcome and/or respective metadata associated with a corresponding validation outcome to the location processing platform 101. The location processing platform 101 may evaluate the validation outcomes and/or the respective metadata associated with the validation outcomes to determine a best validation outcome. The best validation outcome may then be used to determine a validated address for one or more other processing methods (e.g., formatting, sub-location processing, and/or the like).

The location processing platform 101 may use machine learning, higher layer processing, and/or the like to determine the best validation outcome. The location processing platform 101 may determine that a validation outcome is the best validation outcome if the validation outcome has a high reliability (e.g., a reliability that satisfies a particular threshold, a reliability determined to be the highest, a reliability high relative to other reliabilities, and/or the like). The location processing platform 101 may determine that a particular validation outcome has a high reliability based on applying machine learning techniques to determine which characteristics (e.g., characteristics of the address engines 105, characteristics of the validation outcomes, characteristics of the metadata associated with the validation outcomes, and/or the like) indicate a high reliability, similarly to what was described with regard to parsing and standardization.

For example, the location processing platform 101 may determine whether a particular address engine 105 has a high reliability, whether a particular validation technique has a high reliability, whether an attribute of the validation outcome indicates that the validation outcome has a high reliability, and/or the like. Additionally, or alternatively, the location processing platform 101 may determine that particular validation outcome has a high reliability based on determining that a threshold number of the address engines 105 output the same validation outcome, a similar validation outcome, and/or the like.

In some implementations, the location processing platform 101 may use one or more of the address engines 105 to format the location. Formatting the location may comprise modifying the location for readability, for data storage, for generating input for another processing method, and/or the like. For example, an address engine 105 may format the location by adding/removing spaces, adding/removing line breaks, and/or the like. In some implementations, the address engine 105 may instead format a parsed address, a standardized address, a validated address, a partially processed address, and/or the like.

The address engine 105 may send a formatting outcome (e.g., a formatted address candidate, instructions on how to format the location, and/or the like) to the location processing platform 101. In some implementations, the address engine 105 may send metadata associated with the formatting outcome indicating a reliability of the formatting outcome. The metadata associated with the formatting outcome may include information indicating a technique used to determine the formatting outcome. In some implementations, a plurality of the address engines 105 may send a respective formatting outcome and/or respective metadata associated with a corresponding formatting outcome to the location processing platform 101. The location processing platform 101 may evaluate the formatting outcomes and/or the respective metadata associated with the formatting outcomes to determine a best formatting outcome. The best formatting outcome may then be used to determine a formatted address for one or more other processing methods (e.g., sub-location processing and/or the like).

The location processing platform 101 may use machine learning, higher layer processing, and/or the like to determine the best formatting outcome. The location processing platform 101 may determine that a formatting outcome is the best formatting outcome if the formatting outcome has a high reliability (e.g., a reliability that satisfies a particular threshold, a reliability determined to be the highest, a reliability high relative to other reliabilities, and/or the like). The location processing platform 101 may determine that a particular formatting outcome has a high reliability based on applying machine learning techniques to determine which characteristics (e.g., characteristics of the address engines 105, characteristics of the formatting outcomes, characteristics of the metadata associated with the formatting outcomes, and/or the like) indicate a high reliability, similarly to what was described with regard to parsing, standardization, and/or validation.

For example, the location processing platform 101 may determine whether a particular address engine 105 has a high reliability, whether a particular formatting technique has a high reliability, whether an attribute of the formatting outcome indicates that the formatting outcome has a high reliability, and/or the like. Additionally, or alternatively, the location processing platform 101 may determine that particular formatting outcome has a high reliability based on determining that a threshold number of the address engines 105 output the same formatting outcome, a similar formatting outcome, and/or the like.

In some implementations, the location processing platform 101 may use one or more of the address engines 105 to determine a sub-location for the location. Determining a sub-location for the location may comprise identifying a location associated with the location as a unit of a building, identifying a building associated with a unit associated with the location, and/or the like. The address engine 105 may send a sub-location processing outcome (e.g., a sub-location candidate for the location, information identifying one or more sub-location candidates associated with the location, and/or the like) to the location processing platform 101. In some implementations, the address engine 105 may send metadata associated with the sub-location processing outcome indicating a reliability of the sub-location processing outcome. The metadata associated with the sub-processing outcome may include information indicating a technique used to determine the sub-location processing outcome, information on whether the sub-location processing was confirmed through a different technique, a measure of accuracy of the sub-location processing technique that was used, and/or the like. In some implementations, a plurality of the address engines 105 may each send a respective sub-location processing outcome and/or respective metadata associated with a corresponding sub-location processing outcome to the location processing platform 101. The location processing platform 101 may evaluate the sub-location processing outcomes and/or the respective metadata associated with the sub-location processing outcomes to determine a best sub-location processing outcome.

The location processing platform 101 may use machine learning, higher layer processing, and/or the like to determine the best sub-location processing outcome. The location processing platform 101 may determine that a sub-location processing outcome is the best sub-location processing outcome if the sub-location processing outcome has a high reliability (e.g., a reliability that satisfies a particular threshold, a reliability determined to be the highest, a reliability high relative to other reliabilities, and/or the like). The location processing platform 101 may determine that a particular sub-location processing outcome has a high reliability based on applying machine learning techniques to determine which characteristics (e.g., characteristics of the address engines 105, characteristics of the sub-location processing outcomes, characteristics of the metadata associated with the sub-location processing outcomes, and/or the like) indicate a high reliability, similarly to what was described with regard to parsing, standardization, validation, and/or formatting.

For example, the location processing platform 101 may determine whether a particular address engine 105 has a high reliability, whether a particular sub-location processing technique has a high reliability, whether an attribute of the validation outcome indicates that the sub-location processing outcome has a high reliability, and/or the like. Additionally, or alternatively, the location processing platform 101 may determine that particular sub-location processing outcome has a high reliability based on determining that a threshold number of the address engines 105 output the same sub-location processing outcome, a similar sub-location processing outcome, and/or the like.

Based on performing one or more of the processing methods described above (e.g., parsing, standardization, validation, formatting, sub-location processing, and/or the like), the location processing platform 101 may determine the processed address. As stated previously, not every processing method may be performed, some processing methods may be performed in a different order, some or all of the processing methods may be performed concurrently, some or all of the processing methods may be performed iteratively, and/or the like. In some implementations, higher layer processing and/or machine learning may not be used for each processing method performed, used during all processing methods performed, and/or the like. In some implementations, the location processing platform 101 may update one or more of the address engines 105 with the processed address. In some implementations, the location processing platform 101 may update a subset of the address engines 105 with partially processed addresses (e.g., the parsed address, the standardized address, the validated address, the formatted address, the sub-processing address, and/or the like). In this way, each address engine 105 may be updated with a more accurate address than previously stored and allow the same address to be identified across the different address engines 105.

Figure 1C:
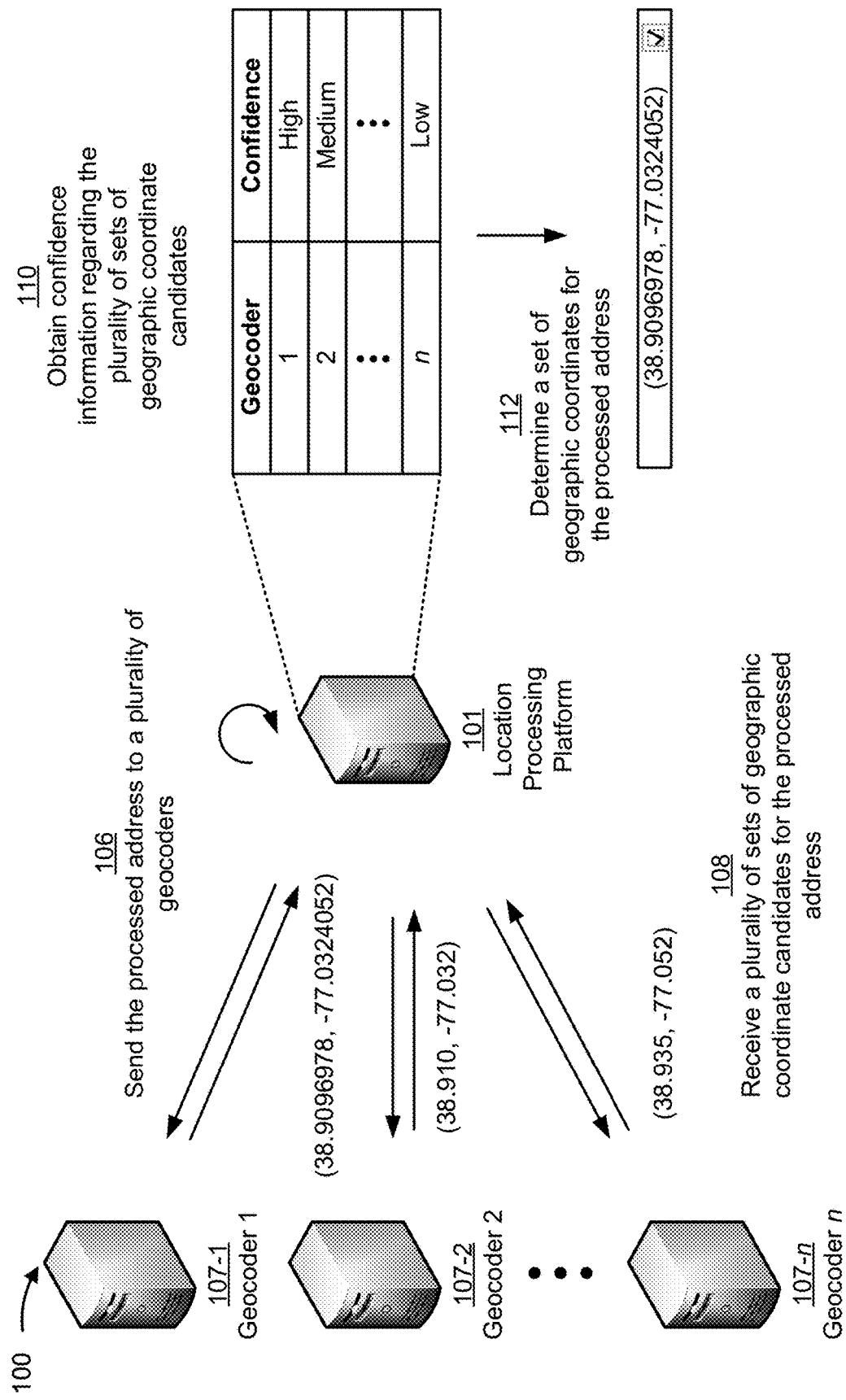

As shown in FIG. 1C, and by reference number 106, the location processing platform 101 may send the processed address to one or more geocoders 107. A geocoder 107, of the one or more geocoders 107, may geocode the processed address and output a set of geographic coordinate candidates. The set of geographic coordinates candidates may include a longitude coordinate candidate, a latitude coordinate candidate, an altitude information candidate, and/or another type of geographic coordinate candidate. The altitude information may be helpful in distinguishing different floors in a building, suites in a complex, and/or the like. The geocoder 107 may use various techniques to determine the set of geographic coordinate candidates. For example, the geocoder 107 may use building centroid geocoding, postal code centroid geocoding, a combination of techniques, and/or the like to determine the set of geographic coordinate candidates. Each geocoder 107, of the one or more geocoders 107, may use one or more different techniques to determine the set of geographic coordinate candidates. This may result in a variety of sets of geographic coordinate candidates output by the different geocoders 107. For example, a first set of geographic coordinate candidates from a first geocoder 107 may have a different number of geographic coordinate candidates, a different accuracy level for a geographic coordinate candidate, a different determination for a geographic coordinate candidate, and/or the like than a second set of geographic coordinate candidates from a second geocoder 107.

As shown in FIG. 1C, and by reference number 108, the location processing platform 101 may receive a plurality of sets of geographic coordinate candidates for the processed address from the geocoders 107. In this way, the location processing platform 101 may determine a set of geographic coordinates by evaluating results derived through various techniques, instead of merely relying on a single technique. This may allow the location processing platform 101 to obtain more accurate results than if using a single technique, since a single technique may not yield accurate results for all types of locations.

As shown in FIG. 1C, and by reference number 110, the location processing platform 101 may obtain confidence information regarding the plurality of sets of geographic coordinate candidates, where the confidence information indicates a measure of reliability regarding an accuracy of the set of geographic coordinate candidates. In this way, the location processing platform 101 may evaluate one or more of the plurality of sets of geographic coordinate candidates for reliability. The location processing platform 101 may use the confidence information to determine whether to use the set of geographic coordinate candidates in determining the set of geographic coordinates. In some implementations, the location processing platform 101 may receive the confidence information as metadata associated with a set of geographic coordinate candidates from a respective geocoder 107. In some implementations, for a particular processed address, each geocoder 107 may send different confidence information to the location processing platform 101. The confidence information may be dependent on the processed address with which the confidence information is associated. Thus, for a particular geocoder 107, the confidence information for a first processed address may be different from the confidence information for a second processed address.

The confidence information may include various information that enables the location processing platform 101 to determine whether a set of geographic coordinate candidates, or even a geographic coordinate candidate within a set of geographic coordinate candidates, is reliable. For example, the confidence information may include what type of technique a geocoder 107 used to determine a set of geographic coordinate candidates (e.g., building centroid geocoding, postal code centroid geocoding, geocoding optimization techniques, a combination of techniques, and/or the like). Additionally, or alternatively, the confidence information may include information regarding whether a physical site survey (e.g., whether physical measurements were taken at a location associated with the location) was conducted to confirm the set of geographic coordinate candidates, whether help desk assistance was utilized to determine the set of geographic coordinate candidates, and/or the like. The confidence information may also include information regarding a type of centroid used (e.g., centroid of a 9-digit postal code, centroid of a 5-digit postal code, and/or the like) to determine the geographic coordinates. The confidence information may also include information regarding whether the location associated with the location is restricted, such as use-restricted by a government, restricted from public access, and/or the like.

As shown in FIG. 1C, and by reference number 112, the location processing platform 101 may determine a set of geographic coordinates for the processed address using the confidence information. The location processing platform 101 may evaluate the confidence information to determine a reliability for each set of geographic coordinate candidates. In turn, the location processing platform 101 may use the reliability information to determine whether a geographic coordinate candidate, or a set of geographic coordinate candidates, is to be used in determining the set of geographic coordinates for the processed address. For example, the location processing platform 101 may determine to use a set of geographic coordinate candidates with a high reliability, a reliability that satisfies a particular threshold, and/or the like as the set of geographic coordinates. In some implementations, one or more sets of the plurality of sets of geographic coordinate candidates with a high reliability, a reliability that satisfies a particular threshold, and/or the like may be combined to generate the set of geographic coordinates. In some implementations, a geographic coordinate candidate (e.g., longitude coordinate candidate) from one set may be combined with a different geographic coordinate candidate (e.g., altitude information) from another set to generate the set of geographic coordinates.

In some implementations, to determine a reliability for each set of geographic coordinate candidates, the location processing platform 101 may use weighting functions to assign a weight to each set of geographic coordinate candidates based on the confidence information. The calculated weights may be used to indicate a measure of reliability (e.g., a higher calculated weight indicating a higher reliability, a lower calculated weight indicating a lower reliability, and/or the like). To accomplish this, the location processing platform 101 may use weighting functions in which different parts of the confidence information are represented by variables and weighted differently. For example, the location processing platform 101 may assign a high weight to a set of geographic coordinate candidates based on a physical site survey being used to confirm the set of geographic coordinate candidates. Through this, particular types of confidence information may have a higher impact than others on a weight, and therefore reliability, of a set of geographic coordinate candidates. In this sense, the location processing platform 101 may be assessing the usefulness, accuracy, usability, and/or the like of the confidence information in determining the reliability of a set of geographic coordinate candidates.

In some implementations, the location processing platform 101 may use artificial intelligence, machine learning, deep learning, and/or the like to determine the set of geographic coordinates. For example, the location processing platform 101 may use machine learning techniques to modify the weighting functions described above to obtain weights that may better indicate a reliability of the set of geographic coordinate candidates. For example, the location processing platform 101 may use a geocoding evaluation model to determine the set of geographic coordinates by evaluating which characteristics of the confidence information, geocoders 107, geographic coordinate candidates, processed address, and/or the like result in a reliable geographic coordinate candidate. The geocoding evaluation model may modify the weighting functions based on determining reliable characteristics to output weights that may be more indicative of reliability. The location processing platform 101 may train the geocoding evaluation model using one or more parameters or historical data associated with determining weights for sets of geographic coordinate candidates.

For example, the location processing platform 101 may determine whether a geocoder 107 has a high reliability for determining a set of geographic coordinate candidates, whether a geocoder 107 has a high reliability for determining a set of geographic coordinate candidates for a particular type of location (e.g., a location in a particular geographic region, a location of a particular format, and/or the like), and/or the like. In some implementations, the location processing platform 101 may determine that particular types of confidence information better indicate reliability of a set of geographic coordinate candidates than other types of confidence information. For example, the location processing platform 101 may determine that confidence information that indicates a site survey was conducted is highly reliable, that confidence information obtained from a particular geocoder 107 is not reliable, and/or the like.

In some implementations, the location processing platform 101 may perform a training operation when generating the geocoding evaluation model. For example, the location processing platform 101 may portion the geocoders 107, the plurality of sets of geographic coordinate candidates, and/or the confidence information into a training set (e.g., a set of data to train the model), a validation set (e.g., a set of data used to evaluate a fit of the model and/or to finetune the model), a test set (e.g., a set of data used to evaluate a final fit of the model), and/or the like. In some implementations, the location processing platform 101 may preprocess and/or perform dimensionality reduction to reduce the sets of geographic coordinate candidates and/or the confidence information to a minimum feature set. In some implementations, the location processing platform 101 may train the geocoding evaluation model on this minimum feature set, thereby reducing processing to train the machine learning model, and may apply a classification technique, to the minimum feature set.

Additionally, or alternatively, the location processing platform 101 may train the model using a supervised training procedure that includes receiving input to the geocoding evaluation model, which may reduce an amount of time, an amount of processing resources, and/or the like to train the geocoding evaluation model, relative to an unsupervised training procedure. In some implementations, the location processing platform 101 may obtain additional confidence information from external sources that confirms a reliability of a geographic coordinate candidate, or a set of geographic coordinate candidates. For example, the additional confidence information may indicate geographical measurements taken at a physical site survey, information indicating a type of global positioning measurement device used to take the geographical measurements at the physical site, which technician conducted the physical site survey, an experience level of the technician who conducted the physical site survey, and/or the like. The additional confidence information may be used to train the geocoding evaluation model. In some implementations, machine learning may be used to evaluate characteristics of the additional confidence information that indicates a high reliability, similarly to what was described before with respect to the geocoding evaluation model.

In some implementations the location processing platform 101 may use one or more other model training techniques, such as a neural network technique, a latent semantic indexing technique, and/or the like. For example, the location processing platform 101 may perform an artificial neural network processing technique (e.g., using a two-layer feedforward neural network architecture, a three-layer feedforward neural network architecture, and/or the like) to perform pattern recognition with regard to patterns of whether the sets of geographic coordinate candidates, and/or the confidence information described using different semantic descriptions may be used to determine the weights for the plurality of sets of geographic coordinate candidates. In this case, using the artificial neural network processing technique may improve an accuracy of a model (e.g., the geocoding evaluation model) generated by the location processing platform 101 by being more robust to noisy, imprecise, or incomplete data, and by enabling the location processing platform 101 to detect patterns and/or trends undetectable to human analysts or systems using less complex techniques.

In some implementations, a different device, such as a server device, may generate and train the geocoding evaluation model. The different device may send the geocoding evaluation model for use by the location processing platform 101. The different device may update and send (e.g., on a scheduled basis, on an on-demand basis, on a triggered basis, on a periodic basis, and/or the like) the geocoding evaluation model to the location processing platform 101.

Based on the techniques described above, the location processing platform 101 may determine the set of geographic coordinates. By evaluating geographic coordinate candidates derived from a plurality of techniques, the location processing platform 101 may determine a more accurate set of geographic coordinates than if the location processing platform 101 relied on a single technique. In some implementations, the location processing platform 101 may update a database associated with a geocoder 107 with the set of geographic coordinates. This may allow other databases associated with the geocoders 107 to also obtain the benefit of an updated or accurate set of geographic coordinates.

Figure 1D:
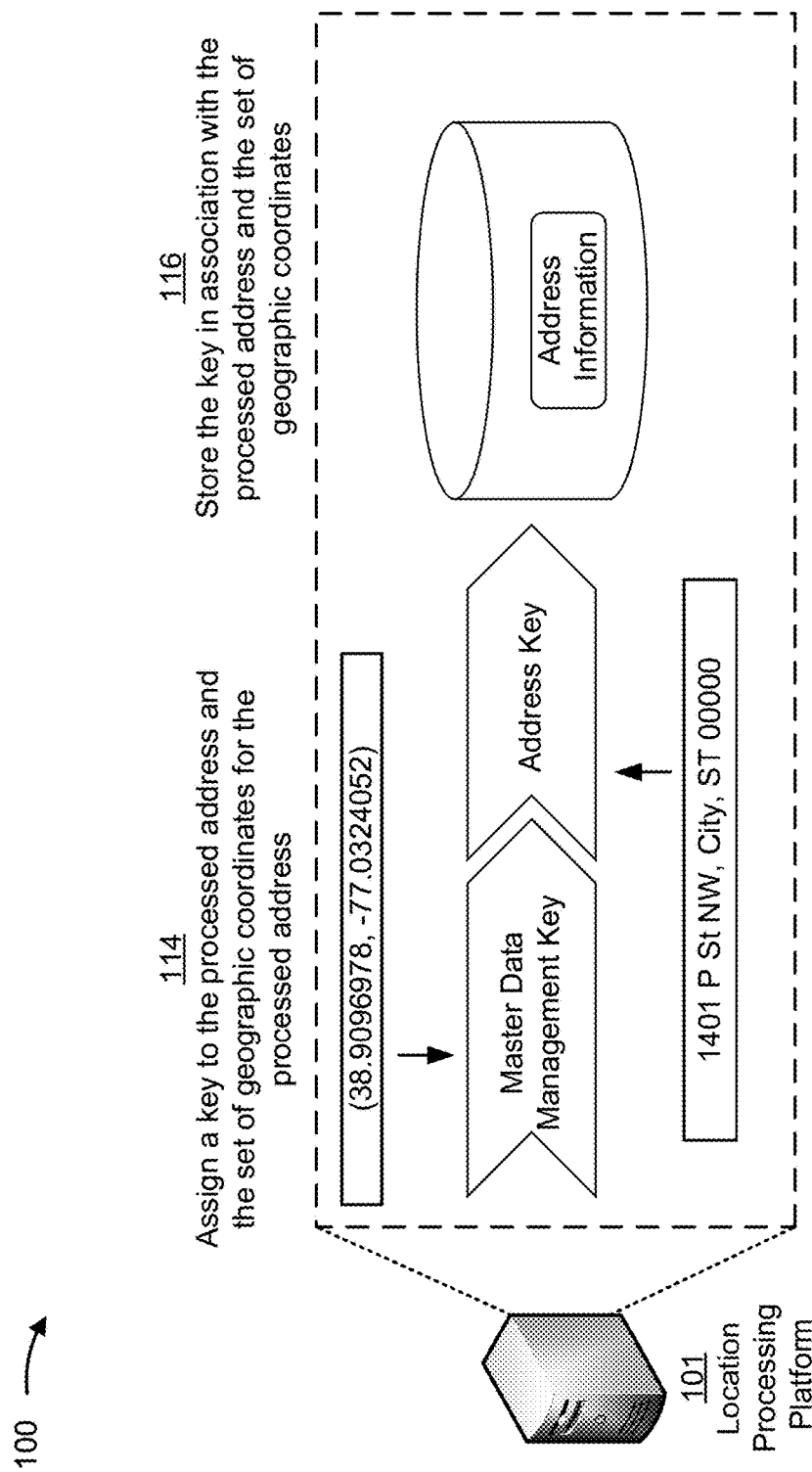

As shown in FIG. 1D, and by reference number 114, the location processing platform 101 may assign a key to the processed address and the set of geographic coordinates for the processed address. For example, the location processing platform 101 may use a function, such as a hash function, to map the processed address and/or the set of geographic coordinates for the processed address to fixed-size values. The resultant mapping may be the key that allows other platforms, devices, and/or the like to access the processed address and the set of geographic coordinates for the processed address. In this way, the location processing platform 101 may integrate different databases and systems by allowing access to the processed address and the set of geographic coordinates for the processed address. For example, systems linked to address engines 105 that determine candidate processed addresses may be able to access the processed address or the set of geographic coordinates using the key. Additionally, or alternatively, systems linked to geocoders 107 that determined the plurality of sets of geographic coordinate candidates may be able to access the processed address or the set of geographic coordinates using the key.

The location processing platform 101 may assign multiple keys (e.g., hash keys) and attach the multiple keys to each other to establish the association. For example, the location processing platform 101 may use a one-way function, such as a hash function, to map the processed address and/or the set of geographic coordinates for the processed address to fixed-size values, resulting in hash keys. This may offer better security than encryption, because of the difficulty in reversing a hash function over decrypting data. In some implementations, the location processing platform 101 may assign a key to the set of geographic coordinates for the processed address and generate a separate key for the processed address. In some implementations, additional keys may be generated from other information associated with the set of geographic coordinates or the processed address. The additional key may identify various information associated with the processed address or the set of geographic coordinates. For example, the additional key may indicate a personnel key indicating one or more persons associated with the processed address, a customer key indicating one or more customers associated with the processed address, a product key indicating one or more products associated with the processed address, and/or the like. In some implementations, the additional key may indicate a territory associated with the processed address or the set of geographic coordinates, a cellular region associated with the processed address or the set of geographic coordinates, and/or the like. This may allow various pieces of information to be linked together to form an updated set of information (e.g., the processed address and the set of geographic coordinates) and allow integration of various databases into a cohesive system.

In some implementations, the location processing platform 101 may use a master key, such as a master data management key. The master key may be used as a common point of reference for all the different keys that may be generated. That is, the additional keys may be attached to the master key to establish the association. For example, additional keys (e.g., personnel keys, customer keys, product keys, and/or the like) may be linked by linking each unique key to the master key. A resultant linked key list may be stored in association with the processed address and the set of geographic coordinates to facilitate access to the processed address or the set of geographic coordinates for the processed address. In some implementations, the location processing platform 101 may generate the master key based on an attribute least likely to change, such as the set of geographic coordinates (as opposed to a person associated with the set of geographic coordinates, a product associated with the set of geographic coordinates, and/or the like). This may allow a more stable system since the additional keys are linked to a single reference point that is unlikely to change, rather than reference points that may be likely to change.

As shown in FIG. 1D, and by reference number 116, the location processing platform 101 may store the key in association with the processed address and the set of geographic coordinates. In some implementations, the location processing platform 101 may use a hash function to allow access to the processed address and the set of geographic coordinates, as well as other information linked to additional keys.

In this way, some implementations described herein may integrate various sources, databases, and/or the like to generate processed addresses (e.g., millions, billions, or more processed addresses) and sets of geographic coordinates for the processed addresses (e.g., millions, billions, or more sets of geographic coordinates), as well as unifying the different sources and databases with the processed address and set of geographic locations. By drawing information from various sources and using one or more of a plurality of techniques, accuracy and reliability may be improved than in a case where only one source and/or technique was used. In turn, this reduces computing resources (e.g., processor resources, memory resources, communication resources, and/or the like) that would otherwise have been used in cases of recovering data due to inaccurate or imprecise results.

As indicated above, FIGS. 1A-1D are provided as examples. Other examples can differ from what is described with regard to FIGS. 1A-1D.

Figure 2:
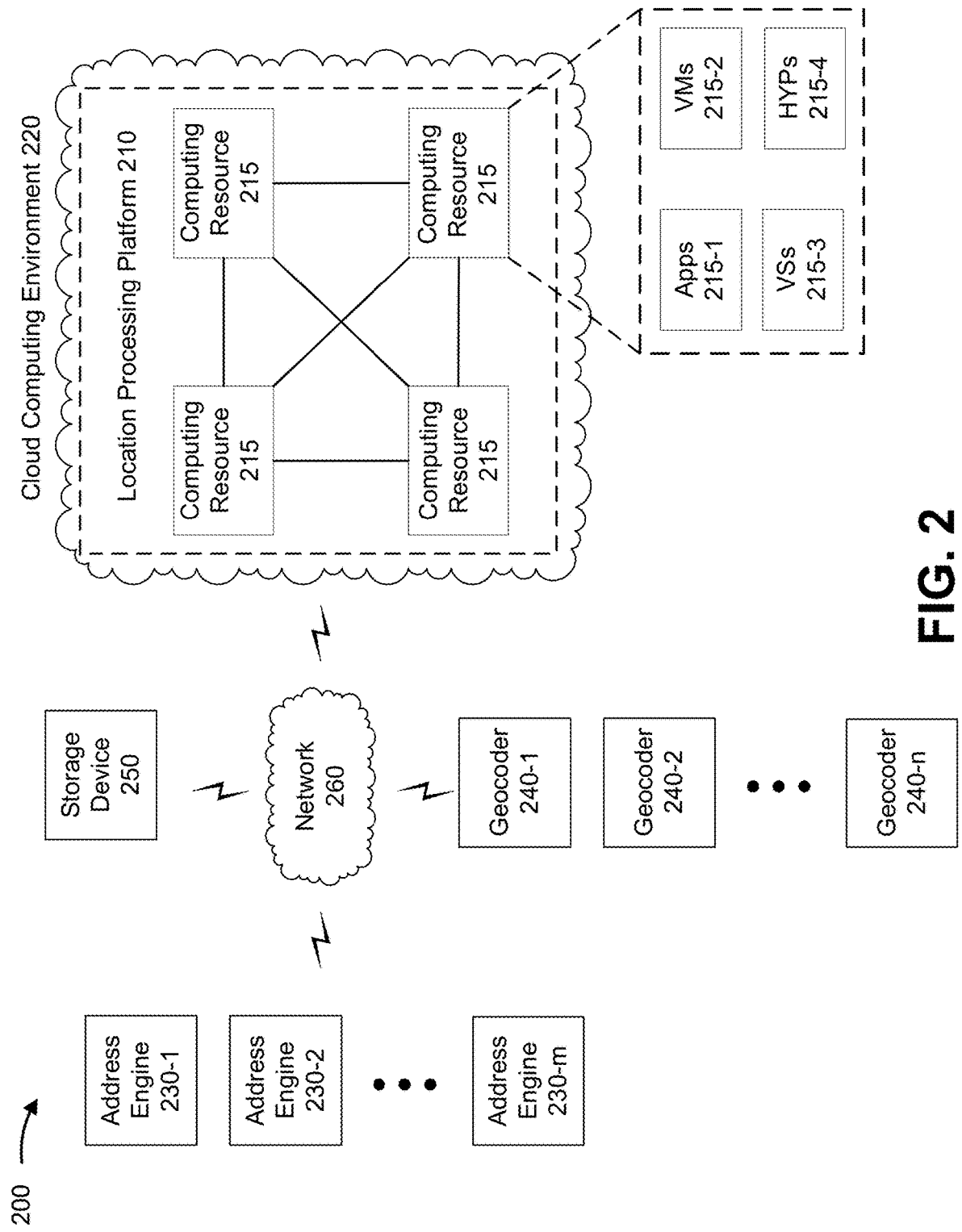
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include location processing platform 210 implemented in a cloud computing environment 220, address engines 230 (e.g., shown as address engines 230-1 to 230-*m*, and referred to individually as address engine 230 and collectively address engines 230), geocoders 240 (e.g., shown geocoders 240-1 to 240-*n*, and referred to individually as geocoder 240 and collectively geocoders 240), a storage device 250, and a network 260. Devices of environment 200 may interconnect via wired connections, wireless connections, or a combination of wired and wireless connections.

Location processing platform 210 includes one or more devices capable of sending, receiving, generating, storing, processing, and/or providing information associated with locations and geographic coordinates. For example, location processing platform 210 maybe a platform implemented by cloud computing environment 220 that may send and/or receive information regarding a location to process a location and/or determine geographic coordinates for the location. In some implementations, location processing platform 210 is implemented by computing resources 215 of cloud computing environment 220. Location processing platform 210 may correspond to location processing platform 101 as described with regard to FIGS. 1A-1D.

While the example environment 200 indicates that location processing platform 210 is implemented in a cloud computing environment 220, in some implementations, location processing platform 210 may be implemented by one or more devices outside of a cloud computing environment, such as a server device, a data center device, and/or the like. In some implementations, location processing platform 210 may be implemented using at least one cloud-based device and at least one non-cloud-based device.

Cloud computing environment 220 includes an environment that delivers computing as a service, whereby shared resources, services, and/or the like may be provided to location processing platform 210. Cloud computing environment 220 may provide computation, software, data access, storage, and/or other services that do not require end-user knowledge of a physical location and configuration of a system and/or a device that delivers the services. As shown, cloud computing environment 220 may include location processing platform 210 and computing resources 215.

Computing resource 215 includes one or more personal computers, workstation computers, server devices, or another type of computation and/or communication device. In some implementations, computing resource 215 may host location processing platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by location processing platform 210. Application 215-1 may eliminate a need to install and execute the software applications on location processing platform 210, and/or the like. For example, application 215-1 may include software associated with location processing platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Address engine 230 includes one or more devices capable of performing location processing. For example, address engine 230 may be implemented using a computer device, such as a server device, a cloud computing device, a data center device, and/or the like. Address engine 230 may correspond to address engine 105 as described with regard to FIGS. 1A-1D. In some implementations, address engines 230 may communicate with (e.g., send data to and/or receive data from) location processing platform 210 and/or network 260 via a wired connection, such as a fiber optic cable, or a wireless connection.

Geocoder 240 includes one or more devices capable of providing geocoding service. For example, geocoder 240 may be implemented using a computer device, such as a server device, a cloud computing device, a data center device, and/or the like. Geocoder 240 may correspond to geocoder 107 as described with regard to FIGS. 1A-1D. In some implementations, geocoders 240 may communicate with (e.g., send data to and/or receive data from) location processing platform 210 and/or network 260 via a wired connection, such as a fiber optic cable, or a wireless connection.

Storage device 250 includes one or more devices capable of receiving, storing, processing, and/or providing information associated with locations. For example, storage device 250 may include a local hard drive, a network hard drive, a computer, a server device, a group of server devices, a cloud computing device, a data center device, and/or the like. Storage device 250 may include hardware, or a combination of hardware and software, that is capable of receiving, storing, and providing information related to a location.

Network 260 includes one or more wired and/or wireless networks. For example, network 260 may include a cellular network (e.g., a long term evolution (LTE) network, a 3G network, a 4G network, a 5G network, another type of generation network, a code division multiple access (CDMA) network, etc.), a public land mobile network (PLMN), a local area network (LAN), a wide area network (WAN), a metropolitan area network (MAN), a personal area network (PAN), a telephone network (e.g., the Public Switched Telephone Network (PSTN)), a private network, an ad hoc network, an intranet, the Internet, a fiber optic-based network, a cloud computing network, a peer-to-peer network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
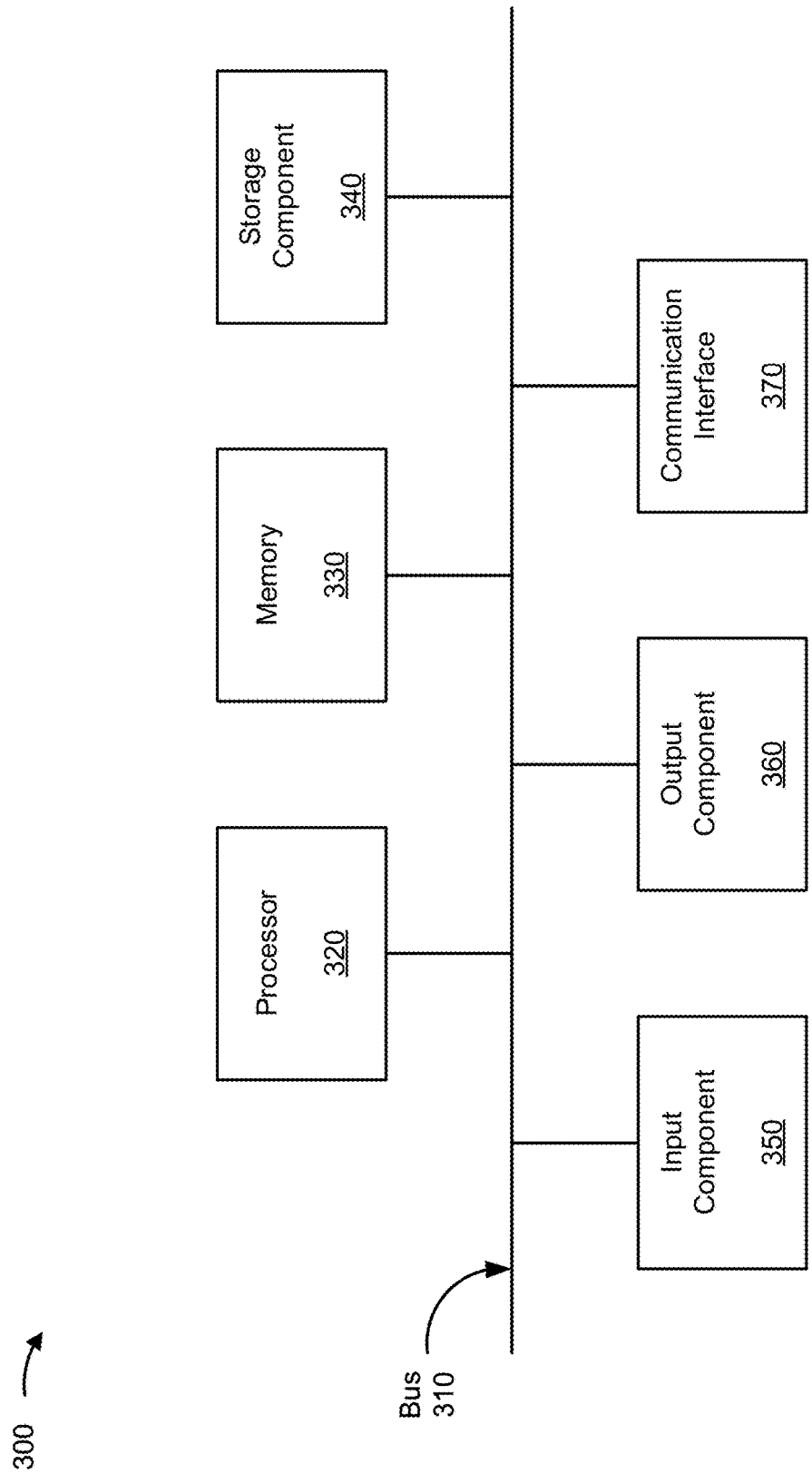
FIG. 3 is a diagram of example components of one or more devices of FIG. 2.

FIG. 3 is a diagram of example components of a device 300. Device 300 may correspond to location processing platform 210, address engine 230, geocoder 240, and/or storage device 250. In some implementations to location processing platform 210, address engine 230, geocoder 240, and/or storage device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for location processing and geocoding optimization. In some implementations, one or more process blocks of FIG. 4 may be performed by a device (e.g., location processing platform 210). In some implementations, one or more process blocks of FIG. 4 may be performed by another device or a group of devices separate from or including the device, such as an address engine (e.g., address engine 230), a geocoder (e.g., geocoder 240), a storage device (e.g., storage device 250), and/or the like.

As shown in FIG. 4, process 400 may include obtaining a location (block 410). For example, the device (e.g., using computing resource 215, processor 320, memory 330, storage component 340, input component 350, output component 360, communication interface 370, and/or the like) may obtain a location, as described above. In some implementations, the location may be a non-standard address that lacks information identifying one or more of the following: a building number, a street name, or a postal code.

As further shown in FIG. 4, process 400 may include processing the location to form a processed address by at least one of: parsing the location, validating the location, standardizing the location, formatting the location, or identifying one or more sub-locations from the location (block 420). For example, the device (e.g., using computing resource 215, processor 320, memory 330, storage component 340, input component 350, output component 360, communication interface 370, and/or the like) may process the location to form a processed address by at least one of: parsing the location, validating the location, standardizing the location, formatting the location, or identifying one or more sub-locations from the location, as described above. In some implementations, the one or more sub-locations may indicate one or more units in a multi-unit building. In some implementations, processing the location to form the processed address comprises: processing the location using information from one or more address databases and updating the one or more address databases with the processed address. In some implementations, process 400 may include obtaining one or more candidate addresses from one or more sources, assessing an address reliability of each of the one or more candidate addresses from the one or more sources, and forming the processed address based on a result of assessing the address reliability of each of the one or more candidate addresses from the one or more sources. In some implementations, process 400 may include obtaining processing information from a plurality of address engines, assessing a confidence level of the processing information of each respective addressing engine of the plurality of address engines, and determining the processed address based on assessing the confidence level of the processing information of each respective address engine of the plurality of address engines.

As further shown in FIG. 4, process 400 may include obtaining, from a plurality of geocoders, a plurality of sets of geographic coordinate candidates for the processed address (block 430). For example, the device (e.g., using computing resource 215, processor 320, memory 330, storage component 340, input component 350, output component 360, communication interface 370, and/or the like) may obtain, from a plurality of geocoders, a plurality of sets of geographic coordinate candidates for the processed address, as described above.

As further shown in FIG. 4, process 400 may include obtaining confidence information regarding the plurality of sets of geographic coordinate candidates (block 440). For example, the device (e.g., using computing resource 215, processor 320, memory 330, storage component 340, input component 350, output component 360, communication interface 370, and/or the like) may obtain confidence information regarding the plurality of sets of geographic coordinate candidates, as described above. In some implementations, the confidence information, for a set of geographic coordinate candidates of the plurality of sets of geographic coordinate candidates, may indicate a measure of reliability regarding an accuracy of the set of geographic coordinate candidates. In some implementations, the confidence information may comprise one or more of: a postal code for the set of geographic coordinate candidates, information regarding government restrictions for the set of geographic coordinate candidates, or site survey information regarding whether the set of geographic coordinate candidates has been confirmed through metrics taken during an on-site visit. In some implementations, the confidence information comprises a precision level associated with geocoding. In some implementations, process 400 may include obtaining adjustment information regarding the set of geographic coordinates to update the set of geographic coordinates and updating the confidence information regarding the plurality of the sets of geographic coordinates based on the adjustment information regarding the set of geographic coordinates. In some implementations, the adjustment information may comprise one or more of: physical measurements of geographic coordinates obtained at the location, or accuracy information regarding the physical measurements of geographic coordinates obtained at the location.

As further shown in FIG. 4, process 400 may include determining a set of geographic coordinates for the processed address based on the plurality of sets of geographic coordinate candidates and the confidence information regarding the plurality of sets of location coordinate candidates (block 450). For example, the device (e.g., using computing resource 215, processor 320, memory 330, storage component 340, input component 350, output component 360, communication interface 370, and/or the like) may determine a set of geographic coordinates for the processed address based on the plurality of sets of geographic coordinate candidates and the confidence information regarding the plurality of sets of location coordinate candidates, as described above. In some implementations, determining the set of geographic coordinates may comprise: obtaining a machine learning model that was trained to determine a geocoding accuracy of a geocoder based on historical information, and using the machine learning model to determine whether one of the plurality of geocoders has a threshold degree of geocoder accuracy in a geographic area associated with the location. In a some implementations, process 400 may include obtaining a machine learning model that was trained to determine an estimated accuracy of a geocoder based on historical confidence information, adjusting the confidence information to form adjusted confidence information based on using the machine learning model to determine the estimated accuracy of one or more of the plurality of geocoders, and determining the set of geographic coordinates for the processed address based on the adjusted confidence information.

In some implementations, process 400 may include assigning weighting functions to the plurality of geocoders using the confidence information to assess accuracy levels of the plurality of geocoders, calculating weights for the plurality of geocoders using the weighting functions, determining a highest accuracy geocoder, of the plurality of the geocoders, based on calculating the weights for the plurality of geocoders, and determining the set of geographic coordinates for the processed address by selecting a set of geographic coordinates associated with the highest accuracy geocoder. In some implementations, process 400 includes assigning weighting functions to the plurality of sets of geographic coordinate candidates, calculating weights for the plurality of sets of geographic coordinate candidates using the weighting functions, and determining the set of geographic coordinates for the processed address based on combining the plurality of sets of geographic coordinate candidates with the weights for the plurality of sets of geographic coordinate candidates. In some implementation, process 400 may include determining a first set of geographic coordinates for a geographic location associated with the processed address, determining a second set of geographic coordinates for a sub-location associated with the processed address, and assigning a key to the second set of geographic coordinates associating the second set of geographic coordinates to the first set of geographic coordinates. In some implementations, the set of geographic coordinates may comprise altitude information obtained through physical measurements obtained through a physical site survey at a geographic location associated with the set of geographic coordinates.

As further shown in FIG. 4, process 400 may include assigning a key to the processed address and the set of geographic coordinates for the processed address (block 460). For example, the device (e.g., using computing resource 215, processor 320, memory 330, storage component 340, input component 350, output component 360, communication interface 370, and/or the like) may assign a key to the processed address and the set of geographic coordinates for the processed address, as described above. In some implementations, the key may associate the set of geographic coordinate candidates, of the plurality of sets of geographic coordinate candidates, with the processed address. In some implementations, process 400 may include associating a key with a secondary key that indicates ones or more of: a personnel key indicating one or more persons associated with the processed address or a product key is indicating one or more products associated with the processed address; and concatenating the key and the secondary key to allow access to the key or the secondary key using an index.

As further shown in FIG. 4, process 400 may include storing, in a storage device, the key in association with the processed address and the set of geographic coordinates to facilitate access to the processed address or the set of geographic coordinates for the processed address (block 470). For example, the device (e.g., using processor 320, memory 330, storage component 340, input component 350, output component 360, communication interface 370 and/or the like) may store, in a storage device, the key in association with the processed address and the set of geographic coordinates to facilitate access to the processed address or the set of geographic coordinates for the processed address, as described above.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, a location;
    processing, by the device, the location to form a processed address by at least one of parsing the location, validating the location, standardizing the location, formatting the location, or identifying one or more sub-locations from the location;
    obtaining, by the device and from a plurality of geocoders, a plurality of sets of geographic coordinate candidates for the processed address;
    obtaining, by the device, confidence information regarding the plurality of sets of geographic coordinate candidates,
        wherein the confidence information indicates a type of centroid geocoding technique or optimization technique that a geocoder, of the plurality of geocoders, used to determine a set of geographic coordinate candidates, of the plurality of sets of geographic coordinate candidates, from the processed address;

determining, by the device, a set of geographic coordinates for the processed address based on the plurality of sets of geographic coordinate candidates and the confidence information regarding the plurality of sets of geographic coordinate candidates;

assigning, by the device, a key to the processed address and the set of geographic coordinates for the processed address; and storing, by the device and using one or more processors of the device, the key in association with the processed address and the set of geographic coordinates to facilitate access to the processed address or the set of geographic coordinates for the processed address,
wherein a hash function is used to access the key in association with the processed address and the set of geographic coordinates.

2. The method of claim 1, wherein the confidence information, for a set of geographic coordinate candidates of the plurality of sets of geographic coordinate candidates, indicates a measure of reliability regarding an accuracy of the set of geographic coordinate candidates.

3. The method of claim 1, wherein forming the processed address comprises:
processing the location using information from one or more address databases, and
updating the one or more address databases with the processed address.

4. The method of claim 1, wherein the key to the processed address and the set of geographic coordinates for the processed address associates the set of geographic coordinate candidates, of the plurality of sets of geographic coordinate candidates, with the processed address.

5. The method of claim 1, wherein determining the set of geographic coordinates comprises:
obtaining a machine learning model, and
determining, using the machine learning model, whether one of the plurality of geocoders has a threshold degree of geocoder accuracy in a geographic area associated with the location.

6. The method of claim 1, wherein the confidence information comprises one or more of:
a postal code for the set of geographic coordinate candidates,
information regarding restrictions for the set of geographic coordinate candidates, or
site survey information regarding whether the set of geographic coordinate candidates has been confirmed through metrics taken during an on-site visit.

7. The method of claim 1,
wherein the key is associated with a secondary key, and
wherein the secondary key indicates one or more of:
a personnel key, or
a product key; and
concatenating the key and the secondary key to allow access to the key or the secondary key using an index.

8. A device, comprising:
one or more processors configured to:
obtain a location;
generate a processed address by validating and standardizing the location;
obtain, from a plurality of geocoders, a plurality of sets of geographic coordinate candidates for the processed address;
obtain confidence information regarding the plurality of sets of geographic coordinate candidates,
wherein the confidence information indicates a type of centroid geocoding technique or optimization technique that a geocoder, of the plurality of geocoders, used to determine a set of geographic coordinate candidates, of the plurality of sets of geographic coordinate candidates, from the processed address;

determine a set of geographic coordinates for the processed address based on the plurality of sets of geographic coordinate candidates and the confidence information regarding the plurality of sets of geographic coordinate candidates;

assign a key to the processed address and the set of geographic coordinates for the processed address; and store, in a storage device, the key in association with the processed address and the set of geographic coordinates to facilitate access to the processed address or the set of geographic coordinates for the processed address,
wherein a hash function is used to access the key in association with the processed address and the set of geographic coordinates.

9. The device of claim 8, wherein the one or more processors are further to:
obtain one or more address candidates from one or more sources;
assess an address reliability of each of the one or more address candidates from the one or more sources; and
form the processed address based on a result of assessing the address reliability of each of the one or more address candidates from the one or more sources.

10. The device of claim 8, wherein the location is a non-standard address that lacks information identifying one or more of the following:
a building number,
a street name, or
a postal code.

11. The device of claim 8, wherein the one or more processors, when determining the set of geographic coordinates for the processed address, are to:
obtain adjustment information regarding the set of geographic coordinates to update the set of geographic coordinates, and
update the confidence information regarding the plurality of the sets of geographic coordinate candidates based on the adjustment information regarding the set of geographic coordinates.

12. The device of claim 11, wherein the adjustment information comprises one or more of:
physical measurements of geographic coordinates obtained at the location, or
accuracy information regarding the physical measurements of geographic coordinates obtained at the location.

13. The device of claim 8, wherein the confidence information comprises a precision level associated with geocoding.

14. The device of claim 8, wherein the one or more processors, when determining the set of geographic coordinates for the processed address, are to:
obtain a machine learning model that was trained to determine an estimated accuracy of a geocoder based on historical confidence information, adjust the confidence information to form adjusted confidence information based on using the machine learning model to determine an estimated accuracy of one or more of the plurality of geocoders, and
determine the set of geographic coordinates for the processed address based on the adjusted confidence information.

15. A non-transitory computer-readable medium storing instructions, the instructions comprising:
one or more instructions that, when executed by one or more processors, cause the one or more processors to:
obtain a location;
process the location to form a processed address by parsing the location, validating the location, standardizing the location, and formatting the location;
obtain, from a plurality of geocoders, a plurality of sets of geographic coordinate candidates for the processed address;
obtain confidence information regarding the plurality of sets of geographic coordinate candidates,
wherein the confidence information, for a set of geographic coordinate candidates of the plurality of sets of geographic coordinate candidates, indicates a measure of reliability regarding an accuracy of the set of geographic coordinate candidates, and
wherein the confidence information indicates a type of centroid geocoding technique or optimization technique that a geocoder, of the plurality of geocoders, used to determine a set of geographic coordinate candidates, of the plurality of sets of geographic coordinate candidates, from the processed address;
determine, based on data received from the plurality of geocoders, a set of geographic coordinates for the processed address based on the plurality of sets of geographic coordinate candidates and the confidence information regarding the plurality of sets of geographic coordinate candidates;
assign a key to the set of geographic coordinates for the processed address; and
store, in a storage device, the key in association with the processed address and the set of geographic coordinates to facilitate access to the processed address or the set of geographic coordinates for the processed address,
wherein a hash function is used to access the key in association with the processed address and the set of geographic coordinates.

16. The non-transitory computer-readable medium of claim 15, wherein the one or more instructions, that cause the one or more processors to determine the set of geographic coordinates for the processed address, cause the one or more processors to:
assign weighting functions to the plurality of geocoders using the confidence information to assess accuracy levels of the plurality of geocoders,
calculate weights for the plurality of geocoders using the weighting functions,
determine a highest accuracy geocoder, of the plurality of the geocoders, based on calculating the weights for the plurality of geocoders, and
determine the set of geographic coordinates for the processed address by selecting a set of geographic coordinates associated with the highest accuracy geocoder.

17. The non-transitory computer-readable medium of claim 15, wherein the one or more instructions, that cause the one or more processors to determine the set of geographic coordinates for the processed address, cause the one or more processors to:
assign weighting functions to the plurality of sets of geographic coordinate candidates,
calculate weights for the plurality of sets of geographic coordinate candidates using the weighting functions, and
determine the set of geographic coordinates for the processed address based on combining the plurality of sets of geographic coordinate candidates with the weights for the plurality of sets of geographic coordinate candidates.

18. The non-transitory computer-readable medium of claim 15, wherein the one or more instructions, that cause the one or more processors to process the location to form the processed address, cause the one or more processors to:
obtain processing information from a plurality of address engines,
assess a confidence level of the processing information of each respective address engine of the plurality of address engines, and
determine the processed address based on assessing the confidence level of the processing information of each respective address engine of the plurality of address engines.

19. The non-transitory computer-readable medium of claim 15, wherein the set of geographic coordinates comprises altitude information obtained through physical measurements obtained through a physical site survey at a geographic location associated with the set of geographic coordinates.

20. The non-transitory computer-readable medium of claim 15, wherein the one or more instructions, when executed by the one or more processors, further cause the one or more processors to:
determine a first set of geographic coordinates for a geographic location associated with the processed address,
determine a second set of geographic coordinates for a sub-location associated with the processed address, and
assign a key to the second set of geographic coordinates associating the second set of geographic coordinates to the first set of geographic coordinates.

* * * * *